Figure 6:
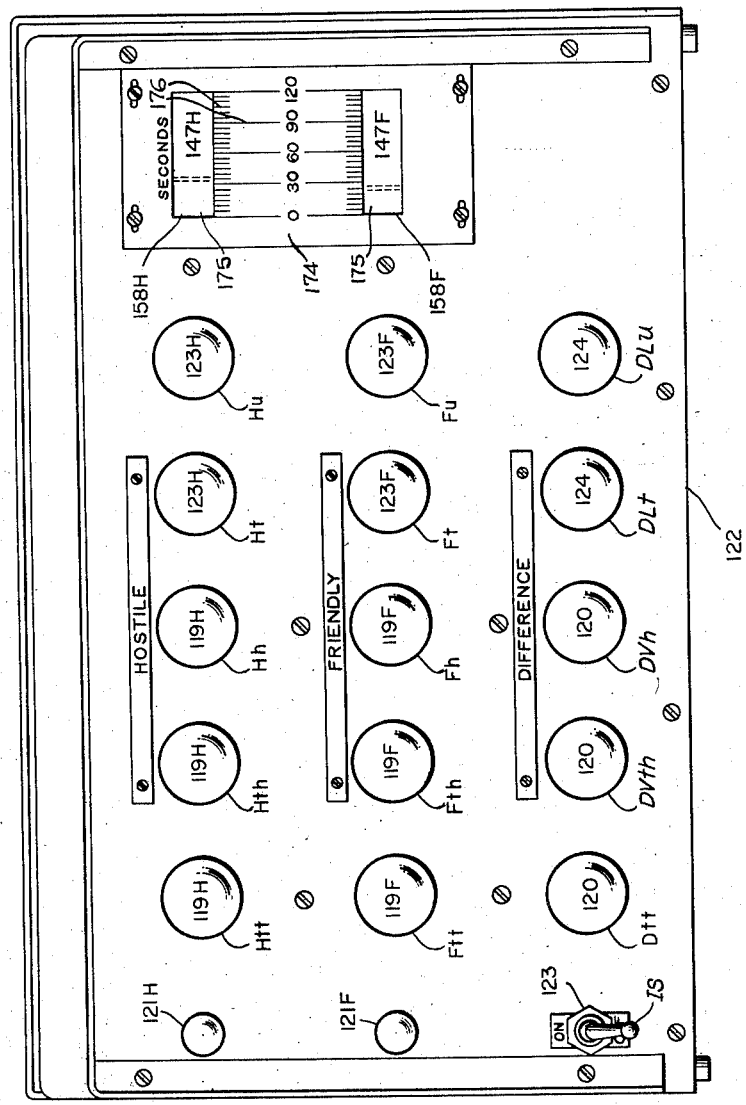

May 6, 1958  A. H. DICKINSON  2,833,468
INDICATING DEVICE
Filed Oct. 1, 1952  9 Sheets-Sheet 1
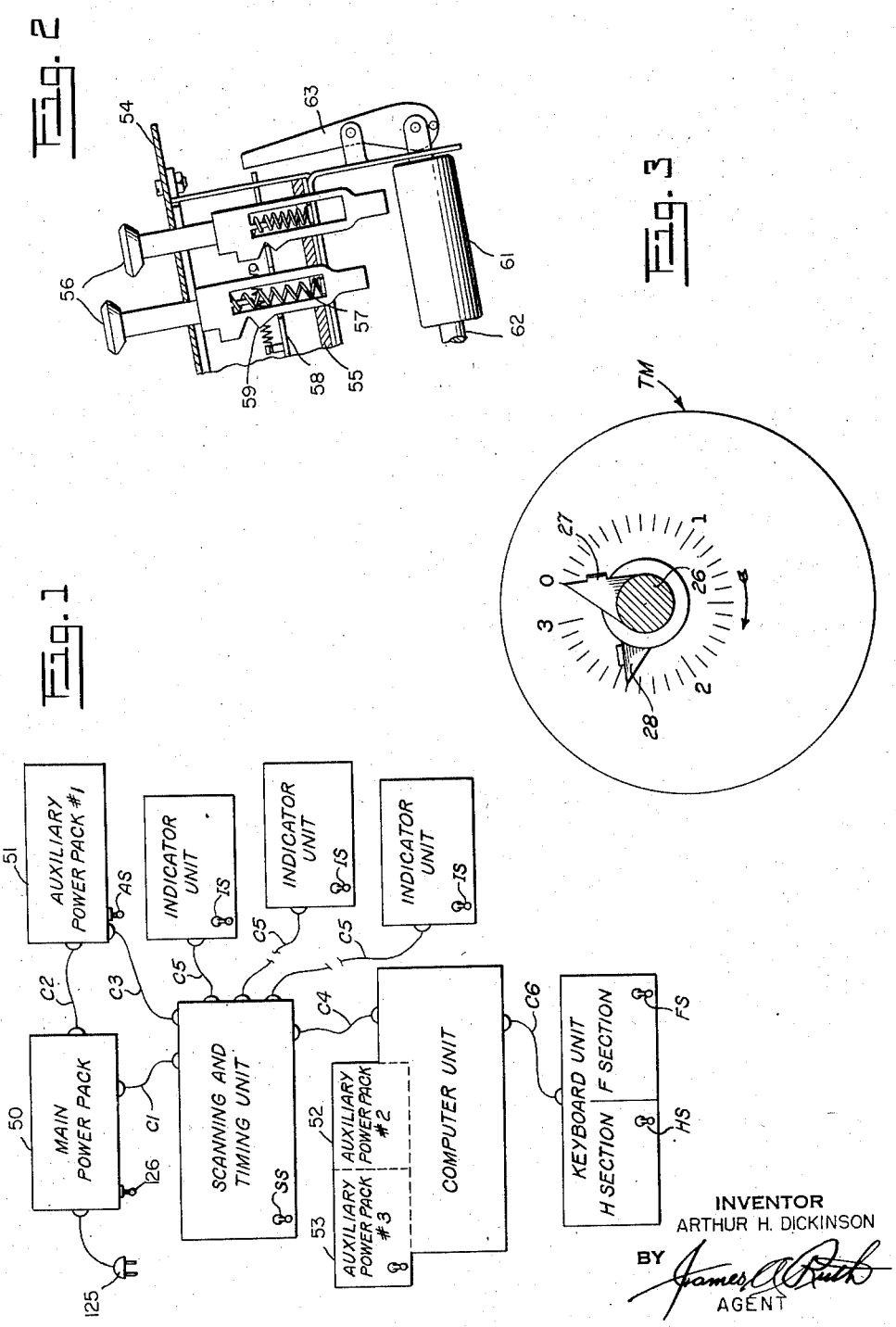
INVENTOR
ARTHUR H. DICKINSON
BY
AGENT May 6, 1958  A. H. DICKINSON  2,833,468
INDICATING DEVICE
Filed Oct. 1, 1952  9 Sheets-Sheet 2
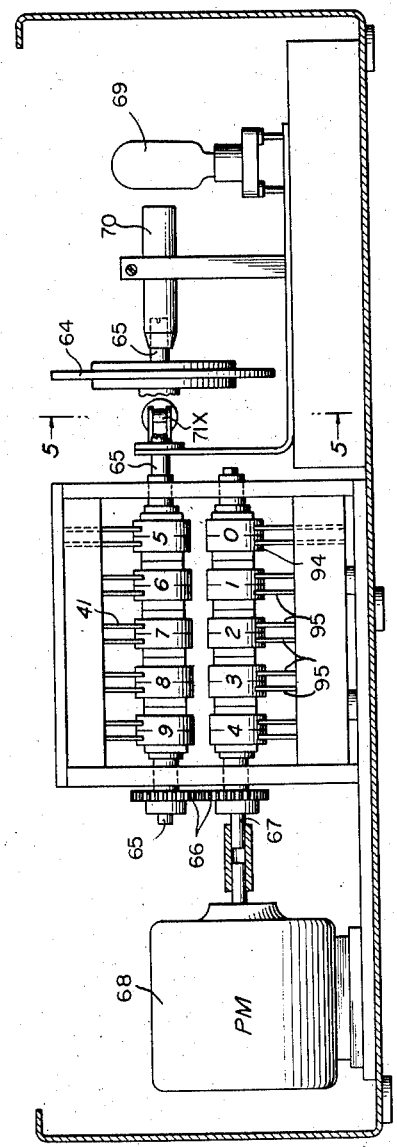
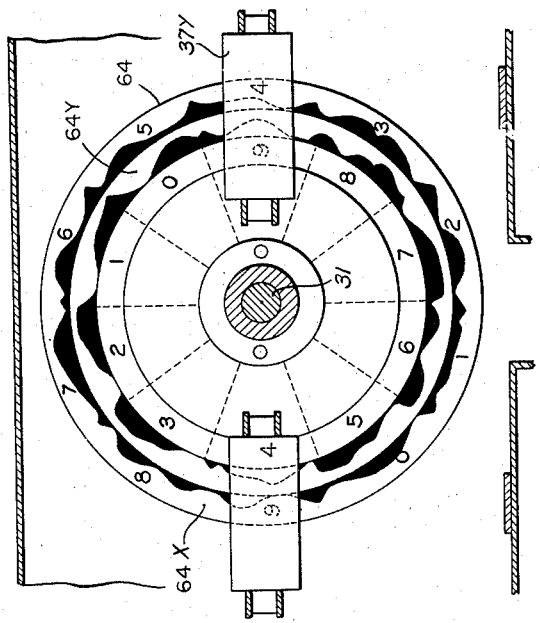
INVENTOR
ARTHUR H. DICKINSON
BY
AGENT May 6, 1958  A. H. DICKINSON  2,833,468
INDICATING DEVICE Filed Oct. 1, 1952  9 Sheets-Sheet 3

INVENTOR
ARTHUR H. DICKINSON
BY
AGENT

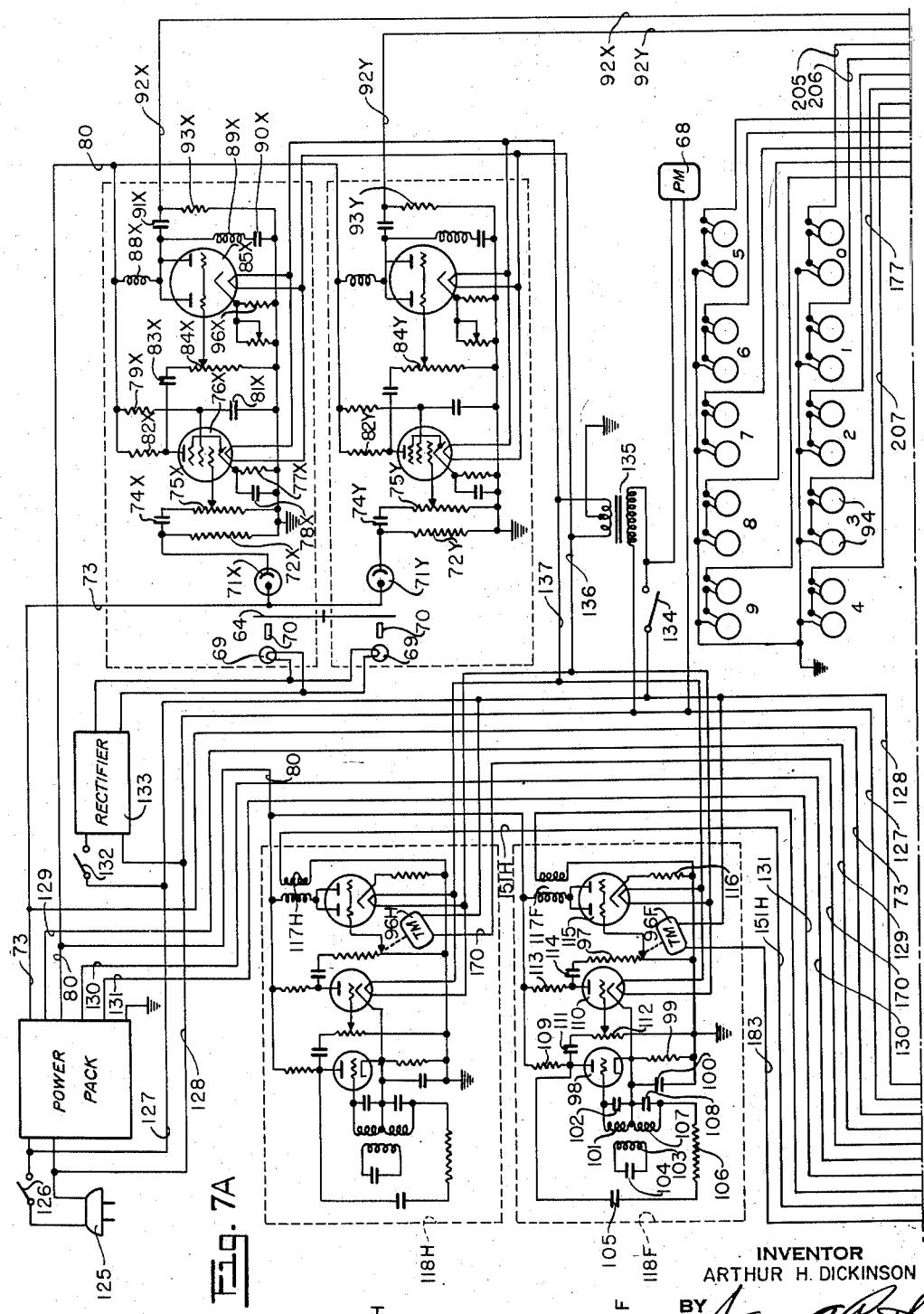

May 6, 1958 A. H. DICKINSON 2,833,468
INDICATING DEVICE
Filed Oct. 1, 1952 9 Sheets-Sheet 5

INVENTOR
ARTHUR H. DICKINSON
BY
AGENT

May 6, 1958

A. H. DICKINSON 2,833,468

INDICATING DEVICE

Filed Oct. 1, 1952

9 Sheets-Sheet 6

INVENTOR
ARTHUR H. DICKINSON
BY
AGENT

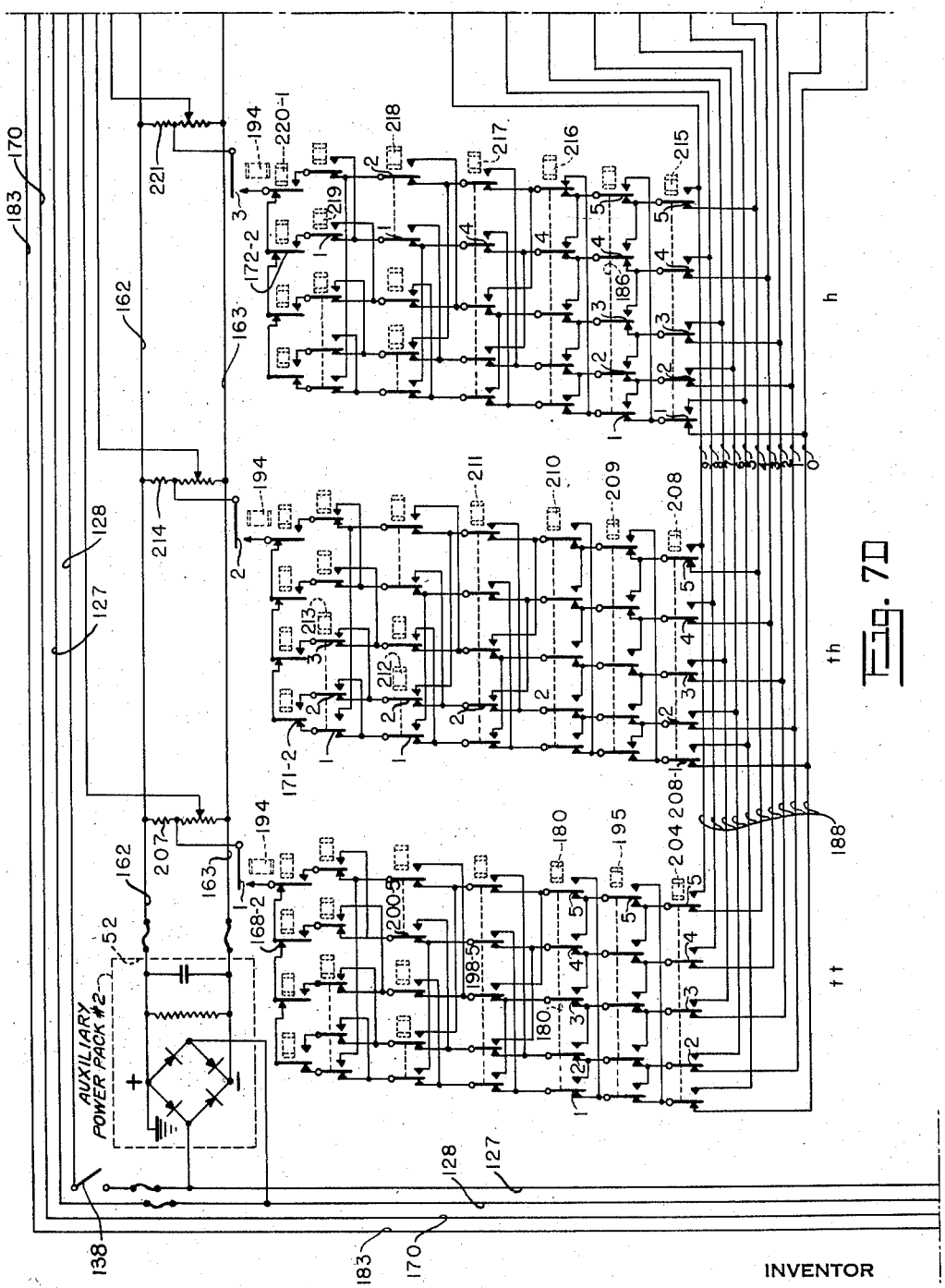

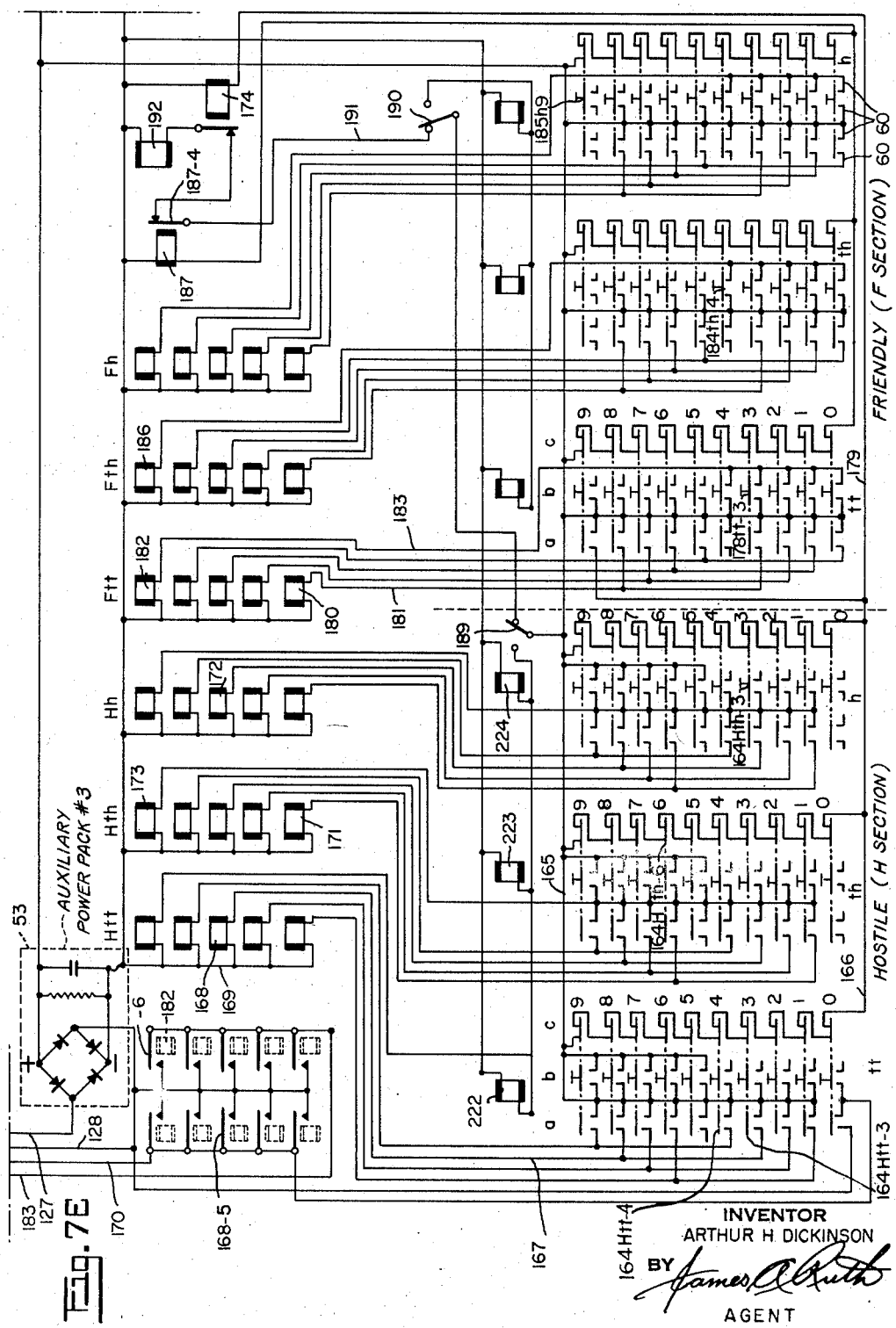

May 6, 1958        A. H. DICKINSON        2,833,468
INDICATING DEVICE
Filed Oct. 1, 1952        9 Sheets-Sheet 9
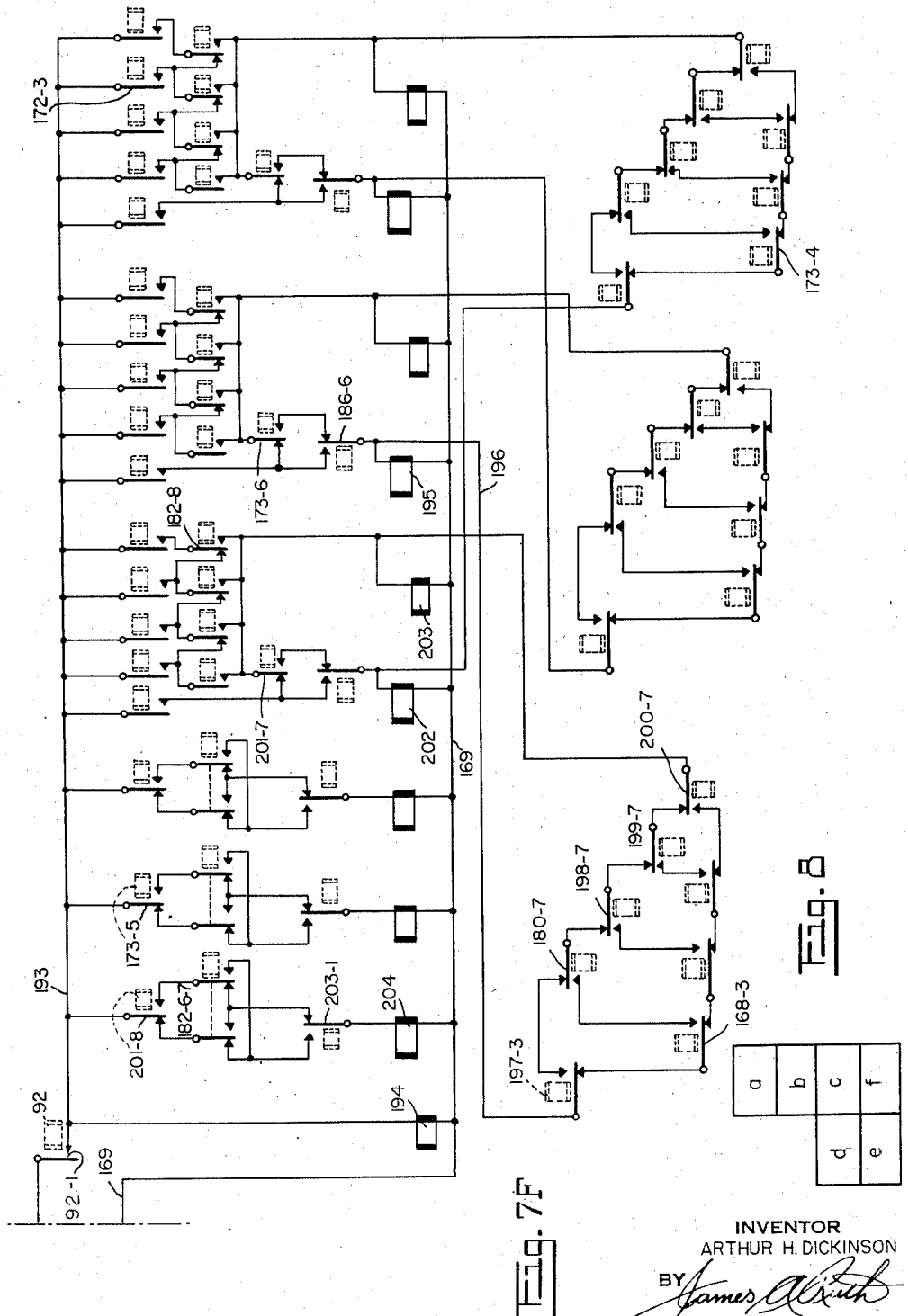
INVENTOR
ARTHUR H. DICKINSON
BY
AGENT

United States Patent Office 2,833,468
Patented May 6, 1958

2,833,468
INDICATING DEVICE

Arthur H. Dickinson, Greenwich, Conn., assignor to International Business Machines Corporation, New York, N. Y., a corporation of New York Application October 1, 1952, Serial No. 312,483

8 Claims. (Cl. 235—61)

This invention relates to remotely controlled indicating devices and in particular to a remote indicating device having cathode ray distance indicating means.

It is an object of the invention to control a remotely located cathode ray tube presentation by high speed algebraic addition devices.

More particularly it is an object of the invention to indicate a plurality of amounts in conventional written form on the faces of cathode ray tubes.

A further object of the invention resides in the provision of means to display a pair of amount factors and their algebraic difference remotely.

Yet another feature of the invention resides in the provision of means to remotely display a pair of amount factors and their algebraic difference in true number form.

Another object of the invention resides in the provision of means for indicating at a remote location that one of a pair of factors which form a difference is the largest.

Yet another object of the invention resides in the provision of means for displaying remotely a pair of factors and their difference substantially instantaneously.

Still another feature of the invention resides in the provision of means to remotely display the elapsed time following the entry of a factor amount.

It is an object of the invention to provide means for instantaneously erasing remotely indicated factors and elapsed time indications.

Another object of the invention resides in the provision of means to control the remote operation of a plurality of distance separated indicators.

Yet another feature of the invention is to provide means to suppress indication of any amount until all figures of two to be displayed amounts are completely entered in the device.

Still another feature of the invention resides in the use of a constant frequency modulated electric wave for producing an elapsed time indication.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 schematically shows the indicating and recording system,

Fig. 2 is a section through a fragment of the keyboard unit,

Fig. 3 is a full scale front view of one of two timer devices provided in the scanning and timing unit, Fig. 4 is a vertical section centrally through the scanning and timing unit, Fig. 5 is a section on line 5—5 of Fig. 4 on an enlarged scale, Fig. 6 is a front vew of one of the indicator units, Figs. 7a, 7b, 7c, 7d, 7e, and 7f constitute the circuit diagram, and Fig. 8 is a box diagram of the arrangement of Figs. 7a to 7f.

1. General description

Referring to Fig. 1, the computing and indicating system comprises a main power pack, an auxiliary power pack #1, a scanning and timing unit, several indicator units, a computer unit which includes auxiliary power packs #2 and #3, and a keyboard unit. As indicated in Fig. 1, the connections intermediate the units are purely electrical, being comprised of wires in plug cables. A cable C1 is plugged between the main power pack and the scanning and timing unit. A cable C2 is plugged between the main and auxiliary power packs, and a cable C3 leads from the auxiliary power pack #1 to the scanning and timing unit. The latter unit and the computer unit are connected by a cable C4. Cables C5 connect indicator units to the scanning and timing unit. Finally, the computer and keyboard units are interconnected by a cable C6. Usually, one of the indicator units will be located, together with the power packs, scanning-timing unit, computer unit and keyboard unit, at a central station, while the other indicator units will be located at distant stations.

The system is of general application to situations where two values are to be set up and indicated, their resultant indicated, and the time quality of the separate values and the result value also indicated. By time quality of a value is meant the time elapsing since the value was set up. And as well it is desired to remotely indicate which one of the two values set up is the greatest.

The schematic arrangement of the various units comprising the computing and distant indicating device known as the Data Repeater is shown in Fig. 1. No mechanical linkages are required intermediate the various units since they are electrically interrelated by pluggable cables.

It is desired to obtain the difference between two quantities and to display said two amounts and the difference at a plurality of distant points. In addition, it is required that a distant indication be given showing which one of the two amounts forming the difference is the greatest.

With the device in operation, the two amounts are manually set in the Keyboard Unit (Fig. 2). The key settings in turn control the Computer Unit wherein electrical networks rapidly perform algebraic addition to obtain the difference and determine which of the two amounts is the greater. The electrical representations of the two amounts and their difference in turn control the Pattern Component Emitter (Fig. 5) and Timer Unit (Fig. 4). This unit, among other devices, contains a pattern component emitter of a cathode ray indicator system such as are disclosed in Patent 2,320,332 to J. W. Bryce, Patent 2,264,587 to R. I. Roth, and Patent 2,264,623 to A. H. Dickinson.

In the operation of the pattern component emitter the two amounts and their difference are transmitted to a plurality of Indicator Units (Fig. 6) where said two amounts and the difference are displayed on the cathode ray tubes in digital form. The circuits in the Computer Unit which determine which of the two entered amounts is the greater directly control colored signal lamps in the Indicator Units.

With regard to each of the two amounts entered upon the Keyboard Unit, as soon as such operation is initiated, timing means in the pattern component emitter and Timer Unit start to operate for determining the time elapsed following an entry. The elapsed time thus determined is displayed by a cathode ray tube in each Indicator Unit. Upon reaching a certain predetermined maximum value, the elapsed time indication is cancelled.

Whenever an amount is cleared from the keyboard, its manifestation and the difference manifestation are no longer displayed by the Indicator Units. Also upon such clearing operation the elapsed time determining means is reset.

2. Mechanical structure

A. Power packs.—In its present embodiment, the Data Repeater has four principal sources of electrical power. The main power pack 50 (Fig. 1) is a high voltage, low current vacuum tube rectifier unit. Auxiliary power pack 51 is a low voltage, high current source while auxiliary power packs 52 and 53 are intermediate voltage, intermediate current sources.

B. Keyboard unit.—Referring to Figs. 2 and 3, this apparatus includes a case outline not shown encompassing key assemblages and supporting face plates 54, 55. Banks of value keys 56 are guided in slots of these plates for vertical, slidable movement. Each key is normally held in upper position by its own spring 57. For each bank of value keys 56 there is one latch bar 58. Each bar is supported by side members, and a leaf spring (not shown) urges the bar to the right. There are slots in the bar, at least one slot for each key to be latched down by the bar. Such key is formed with a lug 59 inclined at the bottom. When a key is in upper position, the bottom of its lug 59 rests against a latch bar 58.

Upon depression of the key, the inclined bottom of its lug 59 cams against the bar to push the bar to the left. As soon as the nose of the lug is through the bar, the leaf spring returns the bar to the right, seating the bar on top of the lug 59. The key is thereby latched down, and may be released by depression of any other key in the same column or bank. Such other key when depressed will, in its initial downward movement, cam the bar 58 to the left in the manner described, and the bar will thereupon release the previously depressed key in the same column or bank. In this fashion, any key will be latched down upon its depression and will be released by depression of another key in the same column.

As illustrative, two groups of three banks each of value keys 56 for the digits through zero are provided. The denominational order relation of the key banks and contacts controlled thereby is designated in Fig. 7e by legends *tt*, *th* and *h*, signifying ten thousands, thousands and hundreds orders respectively. It may be noted here that these legends have a similar significance in association with any other elements of the machine to be described hereinafter. For each value key, there are spring contacts generally designated 60 and which may be differentiated by the digit indicative of the key value; e. g. 56–7 designates the key contacts relating to digit 7 and associated with a key 56–7. Upon depression of a key 56, insulating members not shown carry its inserts associated therewith into engagement with contacts 60 until the key is unlatched and returned to upper position.

Each bank of keys has suitably mounted thereon a solenoid 61, whose core 62 connects to a bell crank 63 whose left edge rests against latch bar 58. Energization of solenoid 61 attracts its core 62 downwardly to impart clockwise rotation to bellcrank 63. Such motion of 63 moves latch bar 58 to the left unlatching any depressed key 56.

C. Computer unit.—The algebraic adding operations in the Data Repeater are effected by electrical networks established by contacts of relays. These relays are housed in the Computer Unit shown in Figs. 7a through 7f.

D. Pattern component emitter and timer unit.—This unit houses the means for generating digits for the cathode ray tube indicators known as the pattern component emitter. Also housed with this emitter are associated light sources, lens systems, photocells and related vacuum tube amplifiers. In addition, this unit also houses the elapsed time determining devices and associated oscillator and modulator vacuum tube circuits. Each of the foregoing will now be described in detail.

The pattern component emitter determines the patterns traced by the cathode ray tubes in the Indicator Units. The patterns to be traced here are digits 0 to 9. The pattern emitter in its general aspects is similar to that disclosed in U. S. Patent 2,264,587 to R. I. Roth. The emitter comprises a pattern disk, scanning means therefor, and amplifying means coupled to the scanning means. The pattern disk is designated 64 (Fig. 5) and is generally transparent except for two opaque concentric tracks 64X and 64Y. Disk 64 is fixed to a shaft 65 which is connected by gears 66 to shaft 67 for rotation by a motor 68. Separate scanning means is used for each track, each scanning means comprising a light source and photocell. Each light source includes a lamp 69 and lens system 70. Both light sources are in front of the disk, but one is located so as to project a concentrated, thin rectangular beam of light radially across track 64X and the other is located so as to project a similar beam of light radially across a diametrically opposite part of track 64Y. Behind track 64X is a photocell 71X to receive whatever light is not blocked by this track. A photocell 71Y is behind track 64Y to receive the light unintercepted by the latter track. Each track is divided into ten equal segments pertaining to the digits 0 to 9. The corresponding digit segments of both tracks are at diametrically opposite locations on the disk 64, so that the digit segment of track 64X and the corresponding digit segment of track 64Y will travel across their respective scanning means simultaneously, upon rotation of the disk. The tracks are of varying radial widths to permit varying amounts of light to pass to the photocells during rotation of the disk. In a manner made clear later, each track has a component share in controlling the tracing of the digits by the cathode ray tubes in the Indicator Unit, presently discussed.

Figure 7B:
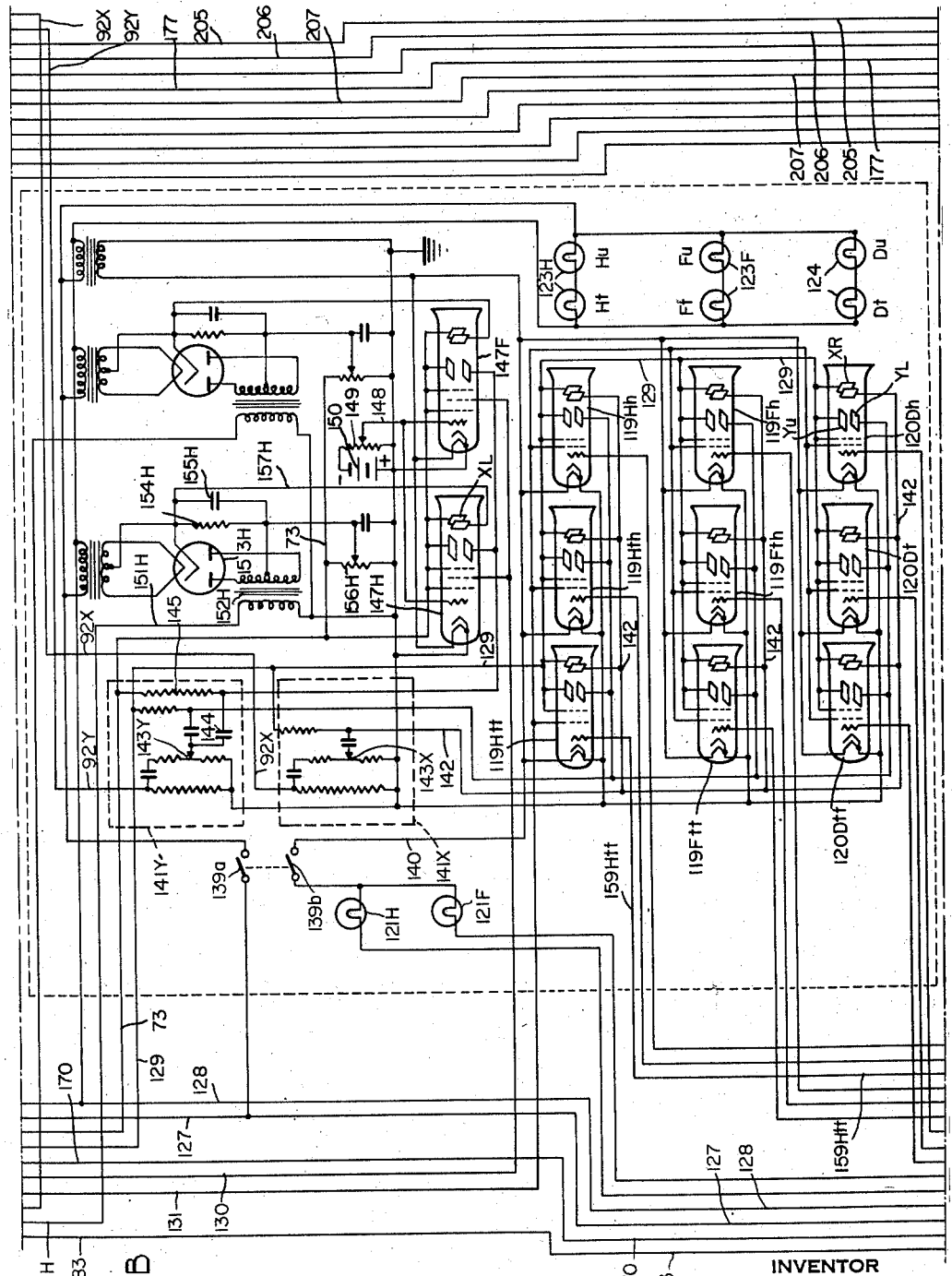

The internal structure of each cathode ray tube is shown in Fig. 7b. Each tube has an indirectly heated cathode, a grid, a No. 1 anode, a No. 2 anode, pairs of deflection plates XR—XL and YU—YL and a fluorescent screen. The path of an electron stream from the cathode to the screen is determined by the potentials on the deflection plates. When there is no potential difference between the plates of each pair, the electron stream impinges the center of the screen. If plate XL is at positive potential relative to plate XR, the electron stream is deflected to the left in a horizontal direction. If the plate XR is positive in potential with respect to plate XL, the electron stream is deflected horizontally to the right. Similarly, plate YL if positive with respect to plate YU deflects the electron stream downwardly in vertical direction, while if plate YU is positive relative to plate YL, the deflection is upward in vertical direction. The potentials on plates XL and XR and on plate YL and YU when at suitable values will exert component deflection forces upon the electron beam, combining to deflect the beam in a resultant direction to strike a desired point of the screen. Further the potentials between the plates of each pair may be successively varied to constantly deflect the beam to predetermined points of the screen in such manner as to trace a desired character. This is done under control of the pattern emitter tracks 64X and 64Y as follows:

Referring to Fig. 7a, photocell 71X and a resistor 72X are serially connected between lines 73 and ground. Resistor 72X connects through a capacitor 74X to a resistor 75X, terminating at ground. Resistor 75X is connected to the control grid of a pentode 76X. The cathode of this tube is connected to ground by a resistor 77X which is shunted by a capacitor 78X. The screen grid of the tube is maintained at substantially steady voltage by connection through a resistor 79X to line 80 and through a capacitor 81X to ground. The suppressor grid of the tube is connected to the cathode. With the above arrangement, current flow in the tube 76X and its anode resistor 82X varies according to its control grid potential.

During each revolution of the disk 64, different radial widths of track 64X pass the scanning means, allowing variable amounts of light to strike the photocell 71X. The impedance of the photocell thereby is varied, so that current flow in resistor 72X also varies. Capacitor 74X transmits these variations to resistor 75X which correspondingly affects the control grid potential of tube 76X. Corresponding, but amplified, changes in current flow occur through tube 76X and its anode resistor 82X. The anode of tube 76X is coupled by a capacitor 83X to a potentiometer 84X, the other side of which is connected to ground. The tap of potentiometer 84X is connected to the control grid of double triode 85X. The cathode of this tube is connected to ground by a resistor 96X which is shunted by another resistor 87X. The anodes of the double triode are both connected to an inductor 88X which terminates at line 80. With the foregoing arrangement, current flow in the double triode 85X and its load impedance 88X varies according to its control grid potential. The anodes of 85X are also connected to inductor 89X and capacitor 91X. Inductor 89X is serially coupled by a capacitor 90X to ground. Capacitor 91X connects via a resistor 93X to ground.

Resistor 93X provides the input impedance in a transmission line 92X and therefore impresses on such line the output of tube 85X. Stated otherwise, the variations in amount of light falling on photocell 71X, as caused by track 64X, are amplified by tubes 76X and 85X for distant transmission. The ten digit segments of track 64X are of such configurations that, in each revolution of disk 64, they produce those potential variations on resistor 93X representative of the horizontal components of deflection forces required in the tracing of the ten digits 0 to 9.

Were not corrective steps taken, the varying potentials produced on resistor 93X would be distorted during transmission to the cathode ray tubes of the Indicator Units. Both phase and frequency distortion would occur. Phase distortion is eliminated by leaving resistors 86X and 87X unshunted by capacitance. With this arrangement, double triode 85X has applied thereto a certain amount of inverse feedback. Adjustable resistor 87X controls the amount of feedback. The provision of inductor 88X in the load circuit of double triode 85X eliminates a large proportion of the frequency distortion. Since the reactance of inductor 88X increases with increasing frequencies, the load resistance of double triode 85X increases with increasing frequency. Accordingly, with this arrangement the certain high frequencies applied to the control grid of 85X are amplified more than other frequencies or are peaked in its output circuit to overcome transmission line losses. Such peaking is augmented by the provision of the resonant circuit comprising inductor 89X and capacitor 90X.

Through similar means, track 64Y produces those potential variations on resistor 93Y required for the vertical components of the deflection forces operating in the tracing of the ten digits. Briefly, the track 64Y varies the amount of light falling upon photocell 71Y. Photocell 71Y varies in impedance, causing variations in current through resistor 72Y which are transmitted by capacitor 74Y to resistor 75Y. The control grid of pentode 76Y is connected to resistor 75Y and variations in current flow through this resistor produce amplified variations of current flow through the pentode and its load resistor 82Y. Consequent changes in potential are produced on resistor 84Y, are amplified, are corrected for distortion and applied to resistor 93Y which provides the input impedance of transmission line 92Y. Thus, the track 64Y controls the potential variations on resistor 93Y.

Since the companion segments of both tracks 64X and 64Y pertaining to a digit are scanned during the same period, the coordinate vertical and horizontal voltages required for the tracing of the complete digit are produced on resistors 93Y and 93X during such period. The digit segments are so arranged (see Fig. 6) that in each revolution of disk 64, digits 9, 8, 7, 6, 5, 4, 3, 2, 1, and 0 would be traced successively on the faces of the cathode ray tubes in the Indicator Unit if the stream of electrons from the cathode to the screen were not interrupted. However, as explained later, the electron stream is interrupted except at such times of the revolutions of disk 64 as the segments pertaining to a selected digit are being scanned. Only the selected digit consequently will be traced in each revolution of disk 64. The speed of disk 64 and the persistence characteristic of the fluorescent screen are such that in successive revolutions of the disk, the repeatedly traced character appears to be stationary on the screen.

The electron stream-interrupting means comprises ten commutators 94–0 to 94–9 (Fig. 4) inclusive. Five of these are fixed to shaft 67 and five are fixed to shaft 65 for common rotation with commutator disk 64. One revolution of shafts 67 and 65 is taken as a measure of an indicating cycle and each cycle is divided into ten index point portions. The electrical features of the respective commutators are indicated in Figs. 4 and 7a. Each commutator comprises two disks suitably adjustable with respect to each other for varying the contact timing. Each disk has contacting and insulating portions which coact with brushes designated 95. The disks comprising a commutator, e. g., 94–9, are so adjusted that one contacting portion times the make and the other contacting portion times the break of the circuit through associated brushes 95. The duration of the circuit through commutator 94–9 and its associated brushes would coincide with the index portion during which segments "9" of the X and Y tracks of disk 64 are scanned to produce those light variations on photocells 64X and 64Y representative of 9.

As mentioned previously, the Pattern Component Emitter and Timer unit houses the elapsed time determining devices and associated oscillator and modulator vacuum tube circuits and these are now discussed. The elapsed time determining device is shown and described in Patent 2,517,987 to A. H. Dickinson and B. F. Ambrosio and will be described only briefly here.

Referring to Fig. 7a, the measurement of elapsed time is obtained by operating a telechron motor or timer provided with certain special features. This motor 96F remains in its fixed home position when 60 cycle alternating current is not applied thereto. Upon application of alternating current, the motor operates and causes shaft (not shown) to rotate. Such shaft rotates at a rate proportional to time, and with regard to the particular timing device employed in this invention, approximately three minutes elapses before one revolution of said shaft is completed.

Upon completion of one revolution, spring tensioned means, which are not a part of this invention, act to drive said shaft to its home position.

The timing motor 96F is adjusted such that only a fraction of one revolution is made and it drives the wiper arm of a fine wire, quality potentiometer 97F. With motor 96F in home position, the center arm of potentiometer 97F uncovers no resistance but as motor 96F operates and its shaft rotates, the center arm of 97F uncovers resistance at a rate proportional to elapsed time. The use of such proportional resistance change will be presently explained.

The electrical manifestation of elapsed time is derived from an oscillator circuit which includes tube 98F, Fig. 7a. The cathode return circuit of 98F includes resistor 99F and parallel capacitor 100F. A coupling circuit between the grid and cathode is comprised of inductor 101F and capacitor 102F in parallel. The fundamental oscillator frequency is derived from the tank circuit comprising inductor 103F and capacitor 104F. This circuit is tuned to the fundamental frequency at which the oscillator operates, which in this invention is approximately one thousand cycles per second.

The anode of tube 98F is coupled to its cathode by means of a stabilizing circuit comprising capacitor 105F and resistor 106F in series with each other and in series with inductor 107F and parallel capacitor 108F. It will be appreciated that inductor 103F is the primary and inductors 101F and 107F are secondaries of a transformer. The aforementioned stabilizing circuit intermediate the anode and cathode of tube 98F acts to maintain the oscillator at a substantially constant frequency irrespective of voltage variations between lines 80 and ground. The anode of tube 98F is connected to line 80 by load resistor 109F.

The output of oscillator tube 98F is fed to a buffer tube 110F by means of capacitor 111F and potentiometer 112F, the wiper of which connects to the grid of tube 110F. The cathode return circuit for 110F is through resistance 99F.

It will be appreciated that once potentiometer 112F is adjusted, the load on the oscillator circuit thereafter remains fixed. The anode of 110F is connected to line 80 through resistor 113F and to ground through a capacitor 114F and the potentiometer 97F. As already explained, the arm of the potentiometer 97F is operated by timer motor 96F. This arm connects to the grids of a double triode 115F. It will be appreciated that, when tube 98F functions, a thousand-cycle per second wave of constant amplitude continually appears on the upper end of resistor 97F. When the timer motor 96F is at home position, the arm of potentiometer 97F it at ground potential. When timer motor 96F operates, however, the arm of 97F uncovers resistance increasing in proportion to the elapsed time, so that the resistance intermediate the control grids of double triode 115F and ground continuously increases. Therefore, the proportion of the amplitude of the thousand-cycle per second wave applied to the grids of tube 115F continuously increases from zero value as time elapses. The cathode of tube 115F is connected to ground by resistor 116F. This resistor is not by-passed by capacitance, thereby introducing an inverse feedback effect stabilizing the operation of tube 115F. The anodes of 115F connect to line 80 through the primary of transformer 117F. The secondary of this transformer is the input impedance of a transmission line which conveys the modulated thousand cycle per second wave to the Indicator Units. The manner in which this modulated wave is employed to control a cathode ray tube to manifest elapsed time is described subsequently in section 3.

A second timer 118 similar to that just described is also provided. Corresponding elements are similarly numbered, but the subscript end letter H is substituted for F. The starting and stopping of timer motors 96F and 96H are described subsequently in section 3.

E. *Indicator unit.*—As is now understood, the manifestations of the two amounts entered on the Keyboard Unit, their difference, their relative magnitude, and the elapsed time since entry, are transmitted to the indicator units at distant points to be displayed by these units.

Each indicator unit houses cathode ray tubes, indicating lights, vacuum tubes, and related circuits, etc. The amount set up in the H section of the Keyboard Unit is displayed by cathode ray tubes 119H in Fig. 6. The amount set up in the F section of the Keyboard Unit is displayed by cathode ray tubes 119F. The difference of the H and F amounts is displayed by cathode ray tubes 120.

Lights 121H and 121F (Fig. 6) are mounted on a display panel 122 (see also Fig. 6) as is also a switch 123. Pilot lights 123H, 123F and 124 are employed in lieu of cathode ray tubes to display 0's which always occur in the tens and units positions of the H, F, and difference amounts. As previously mentioned, cathode ray tubes are employed to indicate elapsed time. In Fig. 6, tubes 147H are associated with the H amount and tubes 147F are related to the F amount.

Overlying the fluorescent screens of each tube 147 is a masking plate 174 having a rectangular window 175 in which appear the manifestation of elapsed time. Embossed on plate 174 are vertical lines 176 which permit determination of elapsed time to the smallest required fraction of a minute. A hood is provided at the front of an Indicator Unit to shield the cathode ray tubes from highlights. The remainder of the Indicator Unit is devoted to suitable supports and housings for the various vacuum tube circuit components and transmission line termini will be subsequently described in section 3.

Having described the various mechanical structures which comprise the Data Repeater, an example of its operation will now be given in connection with the wiring diagram.

3. Circuit diagram

Before placing the machine in operation, the various units are interconnected by cables. In Fig. 1, cable C1 connects the main power supply 50 with the Pattern Component Emitter and Timer Unit. Cable C2 connects auxiliary power pack 51 with main power pack 50. Cable C3 is plug connected between the auxiliary power pack 51 and the Pattern Component Emitter and Timer Unit. Cable C4 is plug connected between the Pattern Component Emitter Unit and the Computer Unit. Cable C5 interconnects the Pattern Component Emitter and an Indicator Unit. Similar cables C5 are utilized in interconnecting each of a plurality of Indicator Units with the Pattern Component Emitter and Timer Unit. Cable C6 plug connects the Keyboard Unit to the Computer Unit.

Having made the aforementioned cable connections, the Data Repeater is placed in operation by connecting plug 125 (Fig. 1) to a 110 volt A. C. source and by closing the switches specified below.

Closure of switch 126 (Figs. 1, 7a) applies alternating current to lines 127 and 128 which extend also to Figs. 7b, 7c, 7d and 7e. Closure of switch 126 also applies power to the main power pack which is of customary design. It is believed sufficient to state that by means of such power pack, varying magnitudes of D. C. voltage are produced between lines 73, 129, 80, 130, 131 and ground. Lines 73, 129, 130 and 131 also extend to Fig. 7b. Line 80 extends only to Fig. 7a. All equipment chassis are bonded together by a ground wire.

The closure of switch 132 (Fig. 7a) connects A. C. lines 127 and 128 to a rectifier 133 for the purpose of supplying a D. C. voltage to both the incandescent lamps 69.

Closure of switch 134 (Fig. 7a) connects A. C. lines 127 and 128 to pattern emitter motor 68, bringing it into operation. With motor 68 in operation, shafts 65 and 67 rotate as do also the disk 64 and commutators 94. Closure of switch 134 also connects lines 127 and 128 to step-down transformer 135, the low voltage output of which is applied to lines 136 and 137 for the purpose of supplying heater current for tubes shown in this figure. The closure of switch 138 (Fig. 7d) connects between A. C. lines 127 and 128 to oxide rectifiers 52 and 53. The output of these rectifiers supply D. C. power for the operation of the relay networks later to be described.

The closure of switch 139a acts to turn on filament power for the remainder of the tubes, while the closure of switch 139b connects lamps 121H and 121F (also see Fig. 6) to line 140, affording a return circuit for the lamps. Also, when switch 139a is closed and power is applied to lines 127 and 128, the zero inicating lamps 123H, 123F and 124 become incandescent.

It was explained in section 2B how the pattern emitter generates the varying voltage representative of the X and Y coordinates of the digits 9 through 0 inclusive. The amplified components of these voltages appear on resistors 93X and 93Y, respectively, in Fig. 7a. Resistor 93X provides the input impedance of a transmission line 92X which extends to an Indicator Unit (Fig. 7b). Line 92X terminates in impedance matching network 141X. The output of this network is via connection wire 142 which makes parallel connection to deflection plates XL of all cathode ray tubes 119H, 119F and 120. Deflection plates XR are connected to line 129. It will be understood from the foregoing circuit description that transmission of the varying voltages representative of the X digital coordinates is effected near ground potential and that the network 141X provides a direct current isolation means when translating voltage variations from a low potential reference point to a high potential reference point. Network potentiometer 143X determines the amplitude of the varying voltages applied to plates XL of cathode ray tubes above-mentioned.

In a substantially similar manner varying voltages on resistor 93 (Fig. 7a), representative of the Y coordinates of the digits 9 through 0 inclusive are transmitted via wire 92Y (Figs. 7a, 7b) to the deflection plates YU of tubes 119H, 119Y and 120 through a network 141Y. The deflection plates YL connect to line 129 as do also the No. 2 anodes of the abovementioned cathode ray tubes. The No. 1 anodes are connected to line 131. The control grids of the cathode ray tubes normally have applied thereto a negative bias sufficient to prevent the electron streams from impinging on the fluorescent screens. The circuit arrangement for this will be discussed presently.

The arm of potentiometer 143Y is also coupled to line 73 by capacitor 144 and resistor 145. The junction of capacitor 144 and resistor 145 is connected to a wire 146 leading to deflection plates YL of the cathode ray tubes 147. Deflection plates YU connect to line 73 as do also the No. 2 anodes. The purpose of applying varying voltage to the vertical component deflection plates of the cathode ray tubes 147 will be discussed subsequently in connection with their indication of elapsed time. The No. 1 anodes of tubes 147 are connected to line 130, and their control grids are connected via wire 148 to the arm of a potentiometer 149 which shunts biasing battery 150 whose positive terminal connects to ground. By this means, the grid bias of tubes 147 may be adjusted to control the intensity of their elapsed time manifestations.

In section 2D, it was explained that the elapsed time indication is controlled by modulating a 1000-cycle per second wave, and that the modulated wave affects transformer 117H (Fig. 7a). One side of the secondary of the transformer 117H connects to ground while the other connects to transmission line 151H which extends to Fig. 7b and the primary of transformer 152H whose other end terminates at ground.

The anodes of double diode 153H connect to the secondary of transformer 152H and the center tap of this secondary connects to load resistor 154H whose other end terminates at the cathode of 153H. Resistor 154H is shunted by condenser 155H. The center tap of transformer 152H also connects to a potentiometer 156H connected between lines 73 and ground.

With no amount standing in the H section of the Keyboard Unit, the elapsed time is zero and the thousand cycle per second wave is not applied by the secondary of transformer 117H (Fig. 7a) to transmission line 151H. Accordingly no voltage is generated across resistor 154H (Fig. 7b) by double diode 153H. The deflection plate XL of cathode ray tube 147H is connected by wire 157H to the cathode of tube 153H. With no voltage developed across resistor 154H, the potential of deflection plate XL is determined solely by the setting of potentiometer 156H. Initially the arm of 156H is adjusted so that the potential difference between plates XR and XL is just sufficient to maintain the beam of 147H at the left edge of window 158 (see also Fig. 6). Since there are no alternating current components ever applied between plates XR and XL of 147H the varying voltage applied to plates YY and YL causes the beam of 147H to trace only a vertical path in the fluorescent screen. Thus, at zero elapsed time adjustment the trace produced by 147H is a vertical line bisected by the left edge of window 158.

As explained previously the entry of an amount in the H section of the Keyboard Unit places timer motor 96 (Fig. 7a) in operation and a thousand cycle per second wave of continuously increasing amplitude is produced and applied to transmission line 151H. Transformer 152H (Fig. 7b) applies such wave form to double diode 153H whose rectifying action produces a direct current voltage of an increasing magnitude across its load resistor 154H. The polarity of this D. C. voltage opposes to an increasing extent the initial potential adjustment of deflecting plate XL of 147H. Accordingly the vertical trace of cathode ray tube 147H traverses from left to right at a uniform rate. In the present invention its rate of travel is such that the line reaches the midpoint on the screen of 147H after one minute of time elapsed and reaches the right edge of window 158H after two minutes have elapsed. Upon return of timer motor 96H (Fig. 7a) to its home position, the output of tube 115H is zero, no 1000 cycle per second wave is transmitted, no potential is generated across resistor 154H (Fig. 7b) and the line of light in the screen of 147H returns to the left edge of window 158H.

From the foregoing it will be understood that the vertical trace of cathode ray tube 147H will travel a fixed distance horizontally in a fixed period of time. More specifically the trace must progress from the left edge of window 158H (see also Fig. 6) to the right edge of 158H in two minutes. Such condition is fulfilled by proper adjustment of the arm of potentiometer 97H (Fig. 7a). This determines the proportion of the output of oscillator 98H which is applied to the grid of buffer tube 110H and hence the amplitude of the thousand cycle per second wave constantly appearing across resistor 97H.

It will be appreciated that the arm of resistor 97H operated by timer motor 96H always traverses a fixed extent in a fixed period of time. Thus, if the output of tube 110H is increased by adjustment of potentiometer 112H, the greater is the amplitude of the one thousand cycle per second wave applied by tube 115H to transmission line 151H at the end of two minutes. Accordingly, the greater the D. C. voltage is that is developed across resistor 154H (Fig. 7b) the larger the displacement of the trace becomes. At the end of the two minute period the trace 147H has travelled across the full width of the screen.

Manifestly, if the output of tube 110H (Fig. 7a) is decreased by adjustment of potentiometer 112H, the less is the amplitude of the one thousand cycles per second wave applied by tube 115H to transmission line 151H at the end of two minutes. Accordingly, a lesser D. C. voltage is developed across resistor 154H (Fig. 7b) at the end of two minutes and the extent of travel of the trace of 147H is decreased. It is thus seen that adjustment of the arm of potentiometer 112H (Fig. 7a) controls the rate of travel of the trace.

In a similar manner an elapsed time manifestation is produced on cathode ray tube 147F by the operation of the timing means which includes timer motor 96F (Fig. 7a) when an amount is entered in the F section of the Keyboard Unit.

Figure 7C:
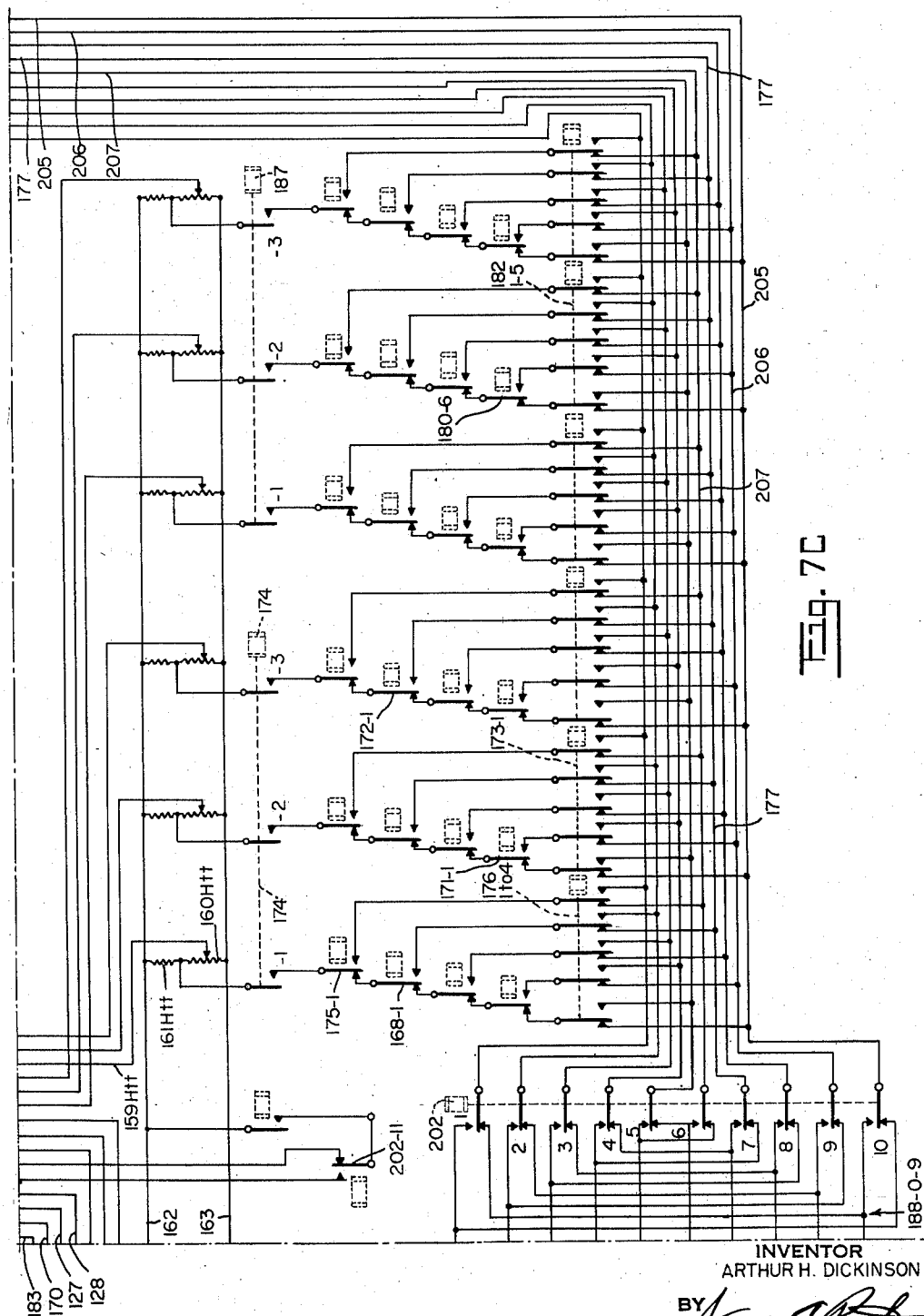

It was previously mentioned in this Section that the control grids of cathode ray tubes 119 and 120 (Figs. 6 and 7b) are negatively biased sufficiently to prevent the respective electron streams from impinging on the fluorescent screens. The control grid of tube 119H*tt* is connected via wire 159H*tt* which extends to arm of potentiometer 160H*tt* in the Computer Unit (Fig. 7c). Potentiometer 160H*tt* together with resistor 161H*tt* forms a voltage divider between lines 162 and 163.

There will presently be described the manner in which resistor 161H*tt* is shorted to line 162 thereby placing potentiometer 160H*tt* solely across lines 162 and 163. When such event takes place, the potential on wire 159H*tt* approaches that of line 162. This is effective to reduce the grid bias of cathode ray tube 119H*tt* sufficiently to permit its electron beam to impinge upon its related fluorescent screen. The manner in which such grid bias reduction is controlled by an entry into the ten thousandths column, H section, of the Keyboard Unit (Fig. 7*e*) follows.

Assume that the H amount is 363 and the F amount is 349. A detailed explanation will now be given of the computing and manifesting operations which occur upon their entry into the keyboard. It will be appreciated that 363 will be displayed by cathode ray tubes 119H, that 349 will be displayed by tubes 119F, that 14 will appear on tubes 120, that lamp 121H will become incandescent indicating that 363 is greater than 349 and that cathode ray tubes 147H and 147F will respectively indicate the time which has elapsed following entry of said two amounts in the Keyboard Unit.

Assuming that 363 is first entered, the operator's depression of "3" value key 164H*tt*–3 (Figs. 2 and 7*e*) shifts its related contacts *a* to *c*. The opening of contacts 164H*tt*–3*c* partially interrupts a circuit intermediate line 165 and wire 166. The closure of contacts 164H*tt*–3*a* completes a circuit from line 165 through said contacts, wire 167 through relay coil 168H*tt* to line 169. The energization of coil 168H*tt* operates a number of associated contacts, 168–1 (Fig. 7*c*), –2 (Fig. 7*d*), –3 (Fig. 7*f*), –4 (Fig. 7*f*), –5 (Fig. 7*e*), which, with the exception of one, are effective upon complete entry of the H amount. Closure of contacts 168–5 completes a circuit from line 128 through said contacts, wire 170 (see also Fig. 7*e*), timer motor 96H (Fig. 7*a*) to line 127. Accordingly, cathode ray tube 147H (Fig. 7*b*) immediately starts to manifest the elapsed time from the instant the operator depresses the key corresponding to the digit in the highest column of the H amount.

It is not believed necessary to trace in detail the operations which occur when keys 164H*th*–6 and 164H*h*–3 are depressed. Closure of their associated contacts causes energization of coils 171 and 172 and 173. With contacts 164H*th*–6*c* and 164H*h*–3*c* open, the circuit between wire 165 and line 166 is finally opened thereby deenergizing relay coil 174 (Fig. 7*e*). The deenergization of coil 174 causes contacts 174–1 to 3 (Fig. 7*c*) to open.

The energization of coils 171, 172, 173 and 168 causes contacts 168–1 and 2, 171–1 and 2, 173–1 through 6 and 172–1 through 4 to shift to a reverse position from that shown. Certain of these contacts together with the closed 174–1 to 3 contacts cause display of the digits 363 respectively by cathode ray tubes 119H*tt*, 119H*th* and 119H*h* (Fig. 7*b*).

With regard to the ten thousandths order H amount, a circuit is completed from line 162 (Fig. 7*c*) through resistor 161H*tt*, contacts 174–1 now closed, contacts 175–1 in the position shown, shifted contacts 168–1, non-shifted contacts 176–4, wire 177 (see also Fig. 7*a*) to commutator 94–3 and upon its closure to ground. Upon the foregoing, resistor 161H*tt* (Fig. 7*c*) is shorted out during the time the deflection voltages are representative of "3." Accordingly, resistor 160H*tt* is connected between ground and 163 and wire 159H*tt* approaches the potential of ground thereby reducing the negative grid bias of cathode ray tube 119H*tt* (Fig. 7*b*). Hence, the electron stream is allowed to impinge on the screen of this tube and a digit 3 is displayed. The shift of contacts 174–3 (Fig. 7*c*) and 172–1 to a reverse position also causes display of a digit 3 on the face of cathode ray tube 119H*h* (Fig. 7*b*) under control of the repeated closure of commutator 94–3 (Fig. 7*a*). In a similar manner the shift of contacts 174–2 (Fig. 7*c*), 171–1 and 173–1 causes the commutator 94–6 (Fig. 7*a*) to control display of a digit 6 on the face of cathode ray tube 119H*th* (Fig. 7*b*). Thus, as long as the amount 363 is in the H section of the Keyboard Unit such quantity is displayed on the faces of the cathode ray tubes 119H.

It is to be noted that digits entered upon the keyboard unit are represented by the combinational energization of relay coils. Such representation is in accordance with the quinary decimal system. Algebraic addition is likewise carried out according to this system. The principles of representing numbers and their algebraic addition according to this system are described in detail in the patent to Lake, Dickinson and Durfee, No. 2,490,362 granted on December 6, 1949.

Upon entry of 349 into the F section of the keyboard, the operator's depression of "3" value key 178F*tt* (Fig. 7*e*) shifts related contacts 178F*tt*–3*a*–*c* from the position shown. The opening of contacts 178F*tt*–3*c* partially interrupts a circuit intermediate line 165 and wire 179. Closure of contacts 178F*tt*–3*a* completes a circuit from line 165 through said contacts, wire 181 through relay coil 180 to line 168. The closure of contacts 178F*tt*–3*b* completes a circuit from line 165 through said contacts, wire 193 through relay coil 182 to line 169. The energization of coils 180 and 182 effects closure of contacts 180–1 through 8 (Figs. 7*c*, 7*d*, 7*f*) and 182–6–7 (Figs. 7*c*, 7*d* and 7*f*). Relay contacts complete a circuit from line 128 through said contacts, wire 183, timer motor 96F to line 127. Accordingly, cathode ray tube 147F (Fig. 7*b*) immediately starts to manifest the elapsed time from the instant the operator depresses the key corresponding to the digit in the highest column of the F amount.

It is not believed necessary to trace in detail the operations which occur when keys 184F*th*4 and 185F*h*9 are depressed. Closure of their associated contacts causes energization of coil 186. With contacts 184F*th*4*c* and 185F*h*9*c* open, the circuit between wire 165 and line 179 is finally opened thereby deenergizing relay coil 187. The deenergization of this coil causes contacts 187–4 to close.

It should be explained at this time, with regard to representing the F amount by the combinational energization of relay coils, that such representation is in accordance with the nines complements of the quinary decimal system. Since the F amount always subtracted from the H amount, it will be seen that the nines complement of the F amount is added to the true H amount to effect subtraction.

The energization of coils 180, 182 and 186 causes contacts 180–1, 182–1–5 and 186–1–5 to shift to a reverse position from that shown. These contacts together with the closed 187–1–3 contacts cause display of 349 by cathode ray tubes 119F (Fig. 7*b*). It is not believed necessary to describe this operation in detail except to point out that the connections to lines 188–0–9 are effected nines complementarily. Thus the nines complementary representation of the F amount is inverted for display by cathode ray tubes 119F in true number form. Having described the manner of controlling the display of the H and F amounts on cathode ray tubes 119H and 119F, the subtraction of the F amount from the H amount and the display of the difference amount will now be discussed.

Referring to Fig. 7*e*, the closure of contacts 174–4 and 187–4 completes a circuit from line 165 through reset switches 189 and 190 in the position shown, wire 191 through said closed contacts and relay coil 192 to line 169. The energization of coil 192 closes contacts 192–1 (Fig. 7*f*) to initiate carry determining operations and to energize via wire 193, relay coil 194. The energization of coil 194 causes closure of contacts 194–1–3. Also upon closure of contacts 192–1 a circuit is completed through the now shifted contacts 173H*th*–6 and 186F*th*–6 to energize relay coil 195. The energization of 195 shifts contacts 195–1–5 (Fig. 7d) to a reverse position from that shown. A circuit also extends from the shifted 186–6 contacts via wire 196 through non-shifted contacts 197–3 shifted contacts 168–3 and 180–7 through non-shifted contacts 198–7, 199–7, 200–7 and 201–7, shifted contacts 182–6 through relay coil 202 to line 169. A circuit also extends from the non-shifted 200–7 through coil 203 to line 169. The energization of 202 shifts contacts 202–1–11 to a reverse position from that shown. The shift of contacts 203–1 to a reverse position interrupts a circuit through non-shifted 201–8 and shifted 182–7 contacts thereby preventing energization of relay coil 204.

Referring to Fig. 7a, commutators 94–0, 94–1 and 94–4 connect lines 205, 206 and 207 to line 162. The circuit for the wire 205 (Fig. 7c) extends through now shifted contacts 202–10, "0" wire of cable 188, non-shifted contacts 204–1, shifted contacts 195–5 and 180–4, non-shifted contacts 198–5, 200, shifted contacts 168–2 and 194–1 through resistor 207 to line 162.

The circuit for 206 extends through now shifted contacts 202–9, "1" wire of cable 188, non-shifted contacts 208–2, 209–2, 210–2, 211–2, 212–2, 213–2, shifted contacts 171–2 and 194–2 through 14 to line 162. The circuit for 207 extends through now shifted contacts 202–6, "4" wire of cable 188, non-shifted contacts 215–5, shifted contacts 186–4, non-shifted contacts 216–4, 217–4, 218–1, 219–1, shifted contacts 172–2, non-shifted contacts 220–1, shifted contacts 194–3 through resistor 221 to line 162.

From the foregoing it is seen that resistors 207, 214 and 221 become shorted during the time the deflection voltages on cathode ray tubes 120D*tt* (Fig. 7b), 120D*t* and 120D*h* are respectively representative of "0," "1" and "4." Thus the respective electron stream impinge on the screens of related tubes at these times and 014 is displayed as the difference.

The foregoing has also described how contacts controlled by coils, which manifest the H and F amounts, are utilized to effect algebraic addition by electrical networks. In addition to these networks there are carry determining circuits and relay coils whose contacts modify the algebraic adding circuits when carry increments must be applied.

Whenever it is desired to introduce a new H or F amount or both, reset switches 189 and 190 are operated. The operation of the former shifts its contacts to a reverse position to complete a circuit from line 165 through solenoids 222, 223, 224 to line 169. The energization of these coils restores the depressed keys in the H section of the keyboard to their non-operated position. When such occurs all C contacts controlled by said keys are closed, thus completing a circuit from line 165 through said contacts, wire 166 (see also Fig. 7c), to energize relay coil 174. Energization of coil 174 opens its contacts 174–1 to effect deenergization of relay coil 192 and interrupt display of the H amount. Deenergization of coil 192 opens its contacts 192–1 thus rendering ineffective all carry determining circuits and deenergizing relay coil 194. Deenergization of coil 194 opens its contacts 194–1–3 to interrupt display of the difference amount.

Similarly, operation of reset switch 190 clears the Keyboard Unit of the F amount and causes energization of relay coil 187 (Fig. 7c) thus interrupting display of the F amount and of the difference amount if a quantity still remains in the H section of the Keyboard Unit.

It should be mentioned that when the H amount 363 is cleared from the Keyboard, relay coil 168 is deenergized, opening its contacts 168–5, thus breaking the circuit to timer motor 96H. As previously explained, timer motor 96H is returned to home position under spring action. Thus, the elapsed time display furnished by cathode ray tube 147H (Fig. 7b) is zeroized. Also, upon clearing the F section, Keyboard Unit, the related circuits are similarly deenergized and reset.

The operation of the Data Repeater has been explained in connection with one Indicator Unit. Other indicator units similar in construction and circuit wiring may be connected by cables similar to C5 to the Pattern Component Emitter and Timer Unit (Fig. 4). When a plurality of indicator units are operated it will be appreciated that corresponding cathode ray tubes display the same digits and elapsed time indications.

While there has been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A cathode ray tube indicating system for a device to display characters, including in combination, a manually operable keyboard for entering values representative of a plurality of to be indicated amounts, a plurality of relay matrix network registers for receiving values as entered in said keyboard, relay matrix network means under the control of said registers operable to obtain a difference between two successively entered value amounts, relay network means operable to convert the difference amount, if in nines complement form to a true value form, a plurality of cathode ray tubes, control means for said cathode ray tubes comprising a rotatable element having light controlling tracks imprinted thereon to variably transmit different amounts of light each representative of a different digit upon rotation of said element, photocell means variably influenced according to the rotation of said element, timing selector means operable to select the time during which one of said variable density areas on the rotatable element will influence a photocell, means under control of said registers for controlling said indicating cathode ray tubes in accordance with the amounts entered therein and the difference computed therefrom whereby said tubes produce a normal visual display of the digit values entered in said keyboard and computed by said registers.

2. A character displaying apparatus, including in combination, a cathode ray tube having a screen and deflector plates for receiving changing potentials to trace the outlines of a set of different characters, means for generating said potentials including a rotatable element having segment portions from which selection is to be made, a value entry receiving keyboard, bi-quinary relay matrix network register means under control of said keyboard adapted to receive a pair of values and to compute the difference therefrom, relay network means operable to convert the difference amount, if in nines complement form, to true number form means under control of said register for selecting the segment portions of said rotatable element including means to permit or suppress impingement of the cathode ray electron beam on the screen of said tubes whereby displays of character as selected by said register may be affected.

3. A character displaying apparatus, including in combination, a cathode ray tube having a screen and deflector plates for receiving changed potentials to trace the outlines of a set of different characters, means for generating said potentials including a rotatable element having segment portions from which selection is to be made, a value entry receiving keyboard, bi-quinary relay matrix network register means under control of said keyboard adapted to receive a pair of values and to compute the difference therefrom, relay network means operable to convert the difference amount, if in nine complement form, to true number form means under control of said register for selecting the segment portions of said rotatable element including means to permit or suppress impingement of the cathode ray electron beam on the screen of said tubes whereby displays of character as selected by said register may be affected, and means operable to suppress indication of any character of any amount until all digits of two to be displayed amounts are completely entered in said keyboard.

4. A character displaying apparatus, including in combination, a cathode ray tube having a screen and deflector plates for receiving changing potentials to trace the outlines of a set of different characters, means for generating said potentials including a rotatable element having segment portions from which selection is to be made, a value entry receiving keyboard, bi-quinary relay matrix register means under control of said keyboard adapted to receive a pair of values and to compute the difference therefrom, relay network means operable to convert the difference amount, if in nines complement form, to true number form means under control of said register for selecting the segment portions of said rotatable element including means to permit or suppress impingement of the cathode ray electron beam on the screen of said tubes whereby displays of character as selected by said register may be affected, and means for indicating the largest value of a pair of factors forming a difference.

5. Cathode ray indicating apparatus of the class described, including in combination, a pattern controlled emitter unit having means to generate and emit potentials representative of the components of a succession of different complete character outlines, said emitter unit comprising a continuously movable means, a series of cathode ray tube displaying devices for displaying multi-digit numbers each device having deflecting plates for receiving said generated potentials, timing selector means operated in timed relation and synchronism with said movable means of the emitter unit, a manually operable keyboard value entry means, an accumulator adapted to receive values entered upon said keyboard, means cooperating with said keyboard and said accumulator for transmitting the nines complement of an augend value to said accumulator after entry of an addend value has been completed, means responsive to the timing selector means and said accumulator for selecting true number result values for display by said cathode ray tubes.

6. Apparatus of the class described for controlling the separate electron beams in a plurality of cathode ray tubes for the display on the faces thereof digit character outlines of multi-digit numbers, comprising, in combination, a manually operable keyboard device for introducing multi-digit numerical values, relay accumulating means adapted to receive augend values entered in said keyboard, means for translating an addend value from its true number notation into the nines complement form, means cooperating with said keyboard and said translating means for entering said complement value in the accumulator for obtaining the difference between said augend and addend values, a rotatable element having a pair of light transmitting controlling tracks thereon with a pair of photocells for receiving varying amounts of light under control of said tracks upon rotation of said element, means under control of said accumulating means for transmitting potentials representative of only the true value of said computed difference and which are generated by said photocells to the cathode ray tubes to control the display of said difference value in true number form by said cathode ray tubes.

7. A character displaying apparatus, including in combination, a cathode ray tube having a screen and deflector plates for receiving changed potentials to trace the outlines of a set of different characters, means for generating said potentials including a rotatable element having segment portions from which selection is to be made, a value entry receiving keyboard, bi-quinary relay matrix network register means under control of said keyboard adapted to receive a pair of values and to compute the difference therefrom, relay network means operable to convert the difference amount, if in nines complement form, to true number form means under control of said register for selecting the segment portions of said rotatable element including means to permit or suppress impingement of the cathode ray electron beam on the screen of said tubes whereby displays of character as selected by said register may be affected, and means operable to suppress indication of any character of any amount until all digits of two to be displayed amounts are completely entered in said keyboard, and means for visually indicating the largest of said pair of values.

8. An indicating device adapted to visually display a plurality of related information data including the character outlines of a plurality of arithmetically related multi-digit numbers simultaneously with a visual display of indicia moving at a predetermined rate, comprising, in combination, a number receiving keyboard means for the manual entry of multidigit numbers, a plurality of cathode ray tubes, one for each digit entered into said keyboard means, means adapted to generate recurrently changing potentials for visually producing the character outlines of each of the digits of the decimal notation on the faces of said cathode ray tubes in accordance with the digits entered into said keyboard means, accumulator means adapted to compute a difference amount between a pair of multidigit numbers successively entered into said keyboard means, cathode ray tube means adapted to display the character outlines of the different digits representative of said difference amount, means responsive to said keyboard means and to said accumulator means for indicating which of said pair of multidigit numbers is the larger value, a pair of timing means each comprising a frequency modulated oscillator each of which timing means is individually responsive to the entry of each of said pair of multidigit numbers by said keyboard means, into said accumulator means, a pair of cathode ray tube means each responsive to said keyboard means, the accumulator means and to said timing means, and each adapted to display a moving indication of time elapsed since entry of each of said pair of multidigit numbers into said keyboard means in accordance with the degree of modulation applied to said timing means oscillators.

References Cited in the file of this patent

UNITED STATES PATENTS

| | | |
|---|---|---|
| 2,264,615 | Bryce | Dec. 2, 1941 |
| 2,402,988 | Dickinson | July 2, 1946 |
| 2,461,412 | Dickinson | Feb. 8, 1949 |
| 2,486,809 | Stibitz | Nov. 1, 1949 |
| 2,538,636 | Williams | Jan. 16, 1951 |